United States Patent
Teo

(10) Patent No.: US 7,093,061 B2
(45) Date of Patent: Aug. 15, 2006

(54) FIFO MODULE, DESKEW CIRCUIT AND RATE MATCHING CIRCUIT HAVING THE SAME

(75) Inventor: Jeff Boon Kiat Teo, Singapore (SG)

(73) Assignee: Avago Technologies Fiber IP (Singapore) Pte. Ltd., Singapore ( * ) Notice: Subject to any disclaimer, the term of this patent is extended or adjusted under 35 U.S.C. 154(b) by 286 days.

(21) Appl. No.: 10/782,613

(22) Filed: Feb. 19, 2004

(65) Prior Publication Data

US 2005/0188146 A1 Aug. 25, 2005

(51) Int. Cl.
*G06F 12/00* (2006.01)
(52) U.S. Cl. ...................................................... 711/101
(58) Field of Classification Search ............... 711/132, 711/219, 101, 110, 5; 710/52
See application file for complete search history.

(56) References Cited

U.S. PATENT DOCUMENTS

| | | | |
|---|---|---|---|
| 6,873,180 B1* | 3/2005 | Bentz | 326/38 |
| 2005/0066120 A1* | 3/2005 | Ohta et al. | 711/112 |

* cited by examiner

*Primary Examiner*—Hiep T. Nguyen

(57) ABSTRACT

A first-in-first-out (FIFO) module is disclosed. The FIFO module includes multiple individually addressable memory locations, a write pointer, a read pointer and at least additional pointer. The write pointer is connected to the memory bank for addressing a first memory location to write a datum on an input data bus into the first memory location. The read pointer is connected to the memory bank for addressing a second memory location to read a datum stored therein onto an output data bus. The at least one additional pointer is connected to the memory bank for addressing a third memory location to read a datum stored therein. A deskew circuit and a rate matching circuit which utilize the FIFO module, and a deskew method are also disclosed.

12 Claims, 6 Drawing Sheets

FIFO MODULE, DESKEW CIRCUIT AND RATE MATCHING CIRCUIT HAVING THE SAME

BACKGROUND

This invention relates to a FIFO module, and a deskew circuit and a rate matching circuit having the same.

The continuing demand for higher speed network connections has resulted in the development of the 10-Gigabit Fiber Channel (10 GFC) and 10-Gigabit Ethernet (10 GbE) networks. In a 10 GbE network, between the media access control (MAC) layer and the physical (PHY) layer, there is a 10-Gigabit Media Independent Interface (XGMII). The XGMII provides full duplex operation at a rate of 10 Gb/s between the MAC and the PHY layers. Each direction of operation is independent of the other and involves 32 bits of data, as well as clock and control signals to define a 74-bit interface between the MAC and the PHY layers.

To overcome issues related to routing such a large number of signals of the 74-bit interface over a distance of more than 7 cm, the 10-Gigabit Attachment Unit Interface (XAUI) was developed. XAUI is a full duplex interface that uses four self-clocked serial differential links in each direction of operation to achieve a 10 Gb/s data rate. Each serial link operates at 3.125 Gb/s to accommodate both data and the overhead associated with 8B/10B coding. The self-clocked nature of the coding eliminates skew concerns between clock and data, and extends the functional reach of the XGMII to approximately 50 cm. Conversion between the XGMII and XAUI interfaces occurs at the XGMII extender sublayer (XGXS).

The transmit and the receive path of the XGMII interface is each organized into four lanes. Each lane uses 8 bit data signals and a 1 bit control signal. At the source side of the XAUI interface, the data for transmission on a given lane as well as a timing clock are converted into a self-clocked, serial, 8B/10B encoded data stream. Each encoded data stream is transmitted across a single differential link to a destination side in frames or packets. At the destination side, the clock is recovered from the incoming data stream. The incoming data is decoded and then mapped back to the 32-bit XGMII format. Thus the 74 pin wide XGMII interface is reduced to a XAUI interface that uses 8 differential pairs for supporting the 8 serial differential links, requiring a total of only 16 pins.

The frames in each lane are separated by inter-frame or inter-packet periods, which are intervals during which no data transmission occurs. The XGMII sends idle control characters during these periods instead. In 10 GbE terms, these periods are known as Inter-Packet Gaps (IPGs). During the IPGs, XGXS converts XGMII idle control characters to and from a randomized sequence of control code-groups to enable serial lane synchronization, clock rate compensation (also known as rate matching) and lane-to-lane alignment (also known as deskewing). This randomized sequence includes control codegroups commonly referred to "A", "K" and "R" codegroups.

A "K" or synchronization codegroup in the data stream enables a XAUI receiver at the receiving side to attain codegroup synchronization on the incoming bit stream. Each lane adjusts for proper alignment to the "K" codegroup whenever it appears. Codegroup synchronization is considered to be achieved on each lane upon reception of four consecutive error free and valid "K" codegroups for the respective lane.

Each serial transmission lane, however, operates independently of the other lanes. Data streams transmitted on a lane can often go out of alignment with respect to data streams transmitted on the other lanes due to different path delays and latencies between the lanes. This misalignment is known as lane-to-lane skew. Lane alignment or deskewing is accomplished by use of the "A" or alignment codegroup. The XGXS defines specific times during the IPG when an "A" codegroup should be present on each of the four lanes, simultaneously. The receiver uses these "A" codegroups to correct lane to lane skew. Correcting lane to lane skew is known as deskewing.

Furthermore, the XGXS compensates for clock rate differences in clock domains that often exist between the transmitting side and the receiving side of a link. By monitoring the difference between incoming and outgoing data rates, the receiver can add or delete "R" or skip codegroups in the IPG to balance or rate match the incoming and the outgoing data rates in each lane.

Typically, a receiver implemented as an application specific integrated circuit (ASIC) includes prior art FIFO modules that are connected to respective deserializers. The prior art FIFO modules are used for buffering data streams received on their respective lanes. Each of the FIFO modules has two pointers—a write pointer and a read pointer. The write pointer points to or addresses memory locations in the FIFO module for writing codegroups in the data stream thereto. The read pointer, which trails the write pointer during operation, points to or addresses memory locations that were previously written to, to allow the codegroups stored therein to be read for further processing.

In order to perform deskewing and rate matching, additional circuits external to the FIFO modules are required in the receiver. These additional circuits include register banks for further buffering read codegroups and comparators for comparing read codegroups with predetermined codegroups etc. Such a design suffers from a variety of disadvantages. Firstly, the chip area of the ASIC is not utilized efficiently due to the need for the additional circuits. The degree of inefficiency depends on how long it takes to compare the read codegroups with the predetermined codegroups, and the number of register banks that are required on the chip is directly proportional to the comparison duration. Hence, the longer the comparison duration, the higher the degree of chip area inefficiency. The hardware structure of the ASIC is thus non-deterministic, as the structure will need to be changed in accordance with the comparison duration.

Secondly, the ASIC would have to be verified at a system level for any change in the additional circuits. Such verification is complicated to perform and is time consuming. Thirdly, deskewing is performed only after control codegroups stored in the FIFO modules are read and made available outside of the FIFO modules. When a memory location is written to, the memory location is read only when the read pointer is advanced to point to that particular memory location. There is therefore a lag between the writing and the reading of a particular memory location, and deskewing can only be done after a control codegroup is read from the memory location. Deskewing is therefore delayed, and rate matching, which is performed after deskewing, is similarly delayed.

SUMMARY

According to an aspect of the invention, there is provided a first-in-first-out (FIFO) module having a memory bank. The memory bank includes multiple individually addressable memory locations. The FIFO module includes a write pointer that is connected to the memory bank for addressing a first memory location to write data on an input data bus into a first memory location. The FIFO module also includes a read pointer that is connected to the memory bank for addressing a second memory location to read data stored therein onto an output data bus. The FIFO module further includes at least one additional pointer that is connected to the memory bank for addressing a third memory location to read data stored therein.

According to another aspect of the invention, there is provided a deskew circuit having at least two of the above-described FIFO modules. The at least one additional pointer includes a look-back pointer that is coupled to the write pointer for addressing the third memory location that trails the first memory location addressable by the write pointer. The deskew circuit also includes a detector that is connected to the memory bank for comparing data in the third memory location with an alignment datum. The detector asserts a datum-found signal when the data in the third memory location matches the alignment datum. The deskew circuit further includes a skew compensation unit that is connected to the at least two FIFO modules. The skew compensation unit receives the addresses of the third memory locations of the respective at least two FIFO modules when the respective datum-found signals are asserted. The skew compensation unit then determines the amount of skew using the addresses and generates a control signal for controlling the write pointer of one of the at least two FIFO modules to compensate for the skew.

According to yet another aspect of the invention, there is provided a rate matching circuit including at least one of the above-described FIFO module. The at least one additional pointer includes a look-ahead pointer that is coupled to the read pointer for addressing a third memory location that leads a second memory location addressable by the read pointer. The rate matching circuit includes a flag circuit that generates a trigger signal when the difference of addresses in the write pointer and the read pointer exceeds a predetermined threshold. The rate matching circuit further includes a detector that is connected to the memory bank for comparing data in the third memory location with a skip datum. The detector asserts a datum-found signal when the data in the third memory location matches the skip datum. The rate matching circuit includes a rate matcher connected to the at least one FIFO module. The rate matcher receives the trigger signal and the datum-found signal and generates a control signal to advance the read pointer so as to skip the third memory location when it is determined that the trigger signal and the datum-found signal are asserted.

BRIEF DESCRIPTION OF DRAWINGS

The invention will be better understood with reference to the drawings, in which:

FIG. 5A is a drawing showing skewed data streams received over four respective lanes;

FIG. 5B is a drawing showing the skewed data streams in FIG. 5A deskewed in respective memory banks using the deskew circuit in FIG. 2.

DETAILED DESCRIPTION

Hereafter, a preferred embodiment of the invention will be described in the context of a receiver for receiving four data streams transmitted over four respective lanes of a XAUI interface in a 10 Gigabit Ethernet. However, it is to be understood that the invention is usable in other interfaces, such as an interface in the 10 GigabitFiber Channel. It is also to be understood that the invention can be used in a receiver for receiving two or more data streams transmitted over a respective number of communication channels.

Figure 1:
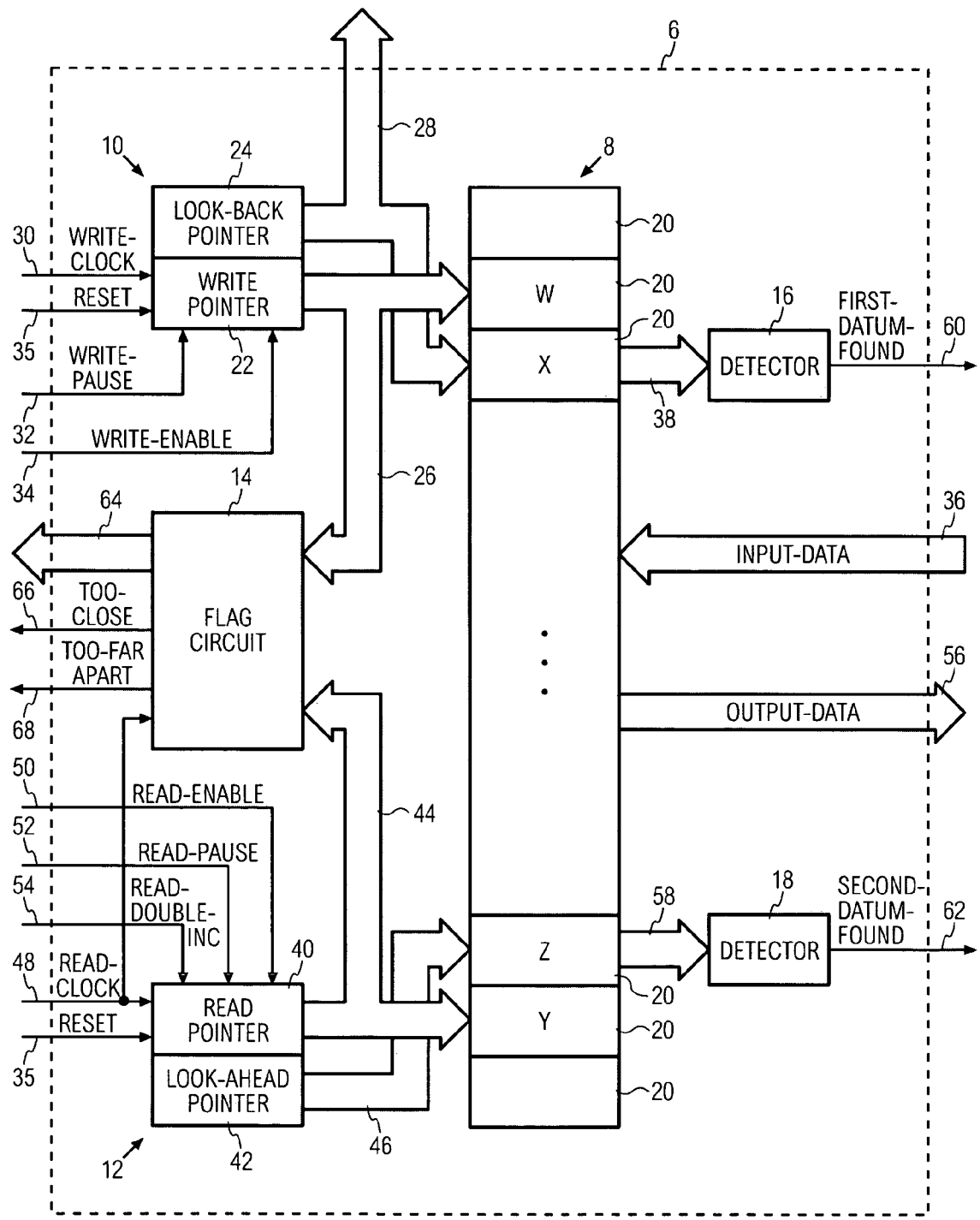
FIG. 1 is a schematic diagram of a FIFO module according to one embodiment of the invention.
Figure 2:
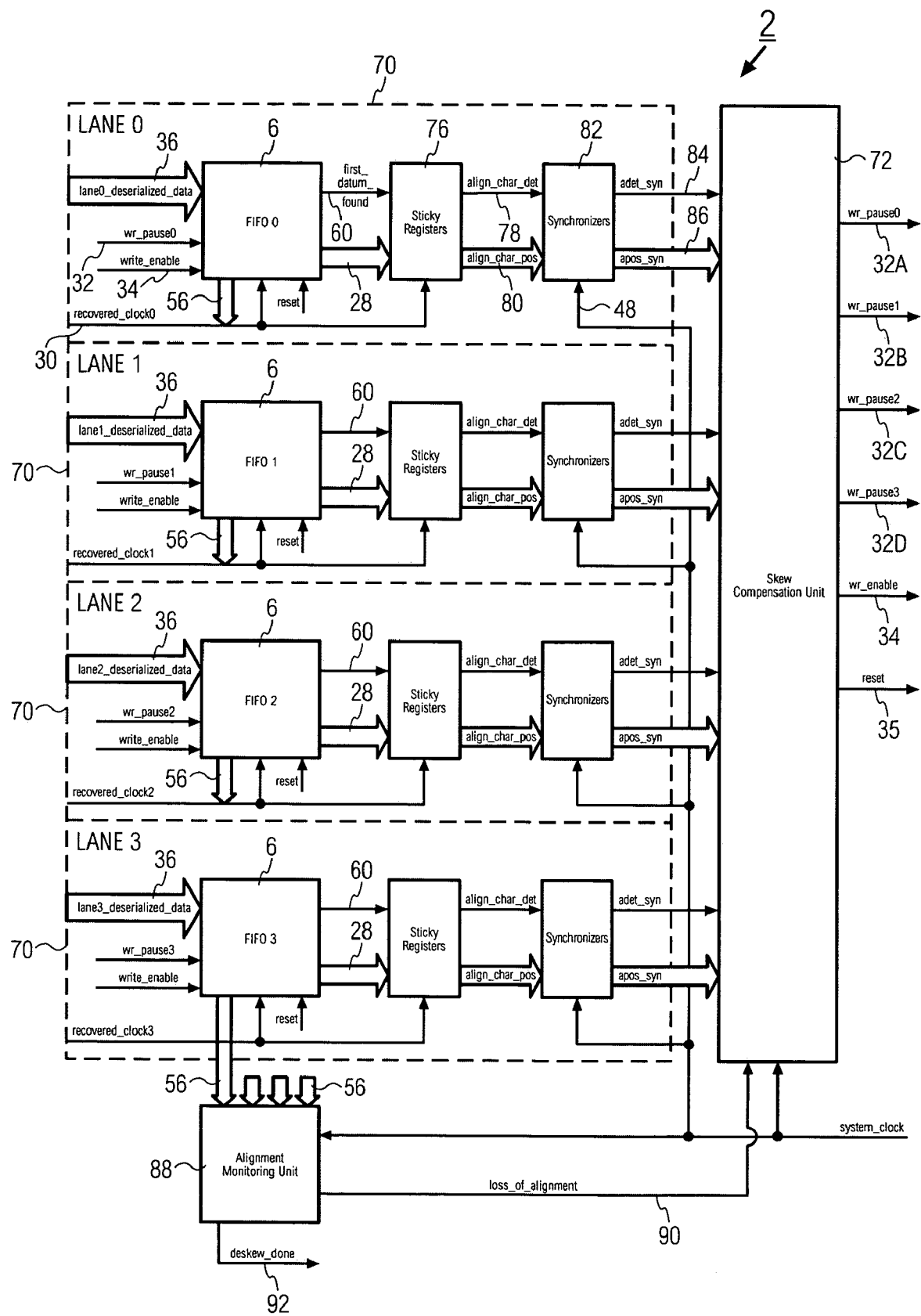
FIG. 2 is a schematic diagram of a deskew circuit that includes four units of the FIFO module in FIG. 1.
Figure 3:
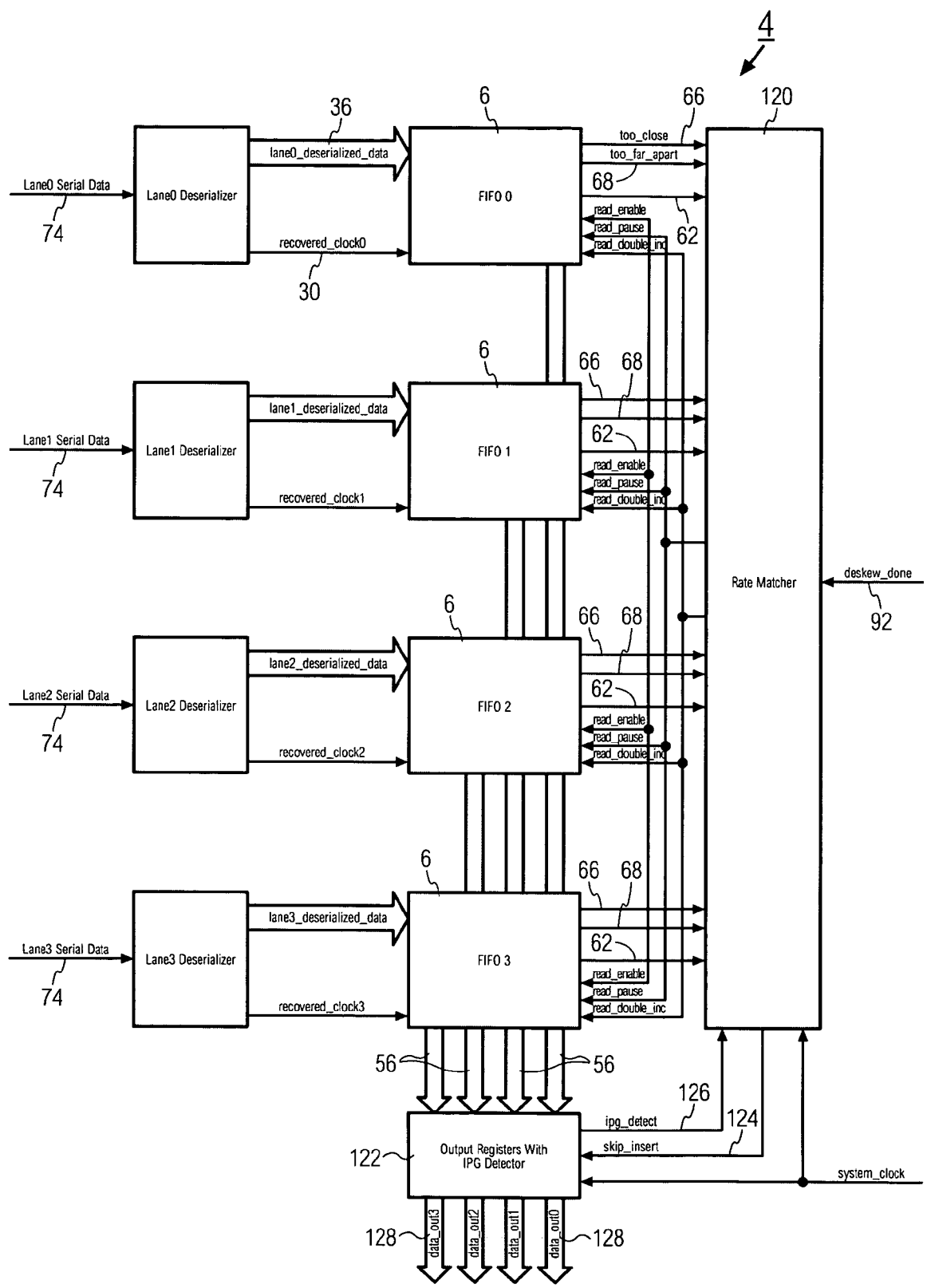
FIG. 3 is a schematic diagram of a rate matching circuit that includes four units of the FIFO module in FIG. 1.

According to one embodiment of the invention, the receiver includes a deskew circuit 2 and a rate matching circuit 4 as shown in FIGS. 2 and 3 respectively. The receiver includes four first-in-first-out (FIFO) modules 6, one of which is shown in detail in FIG. 1.

With reference to FIG. 1, the FIFO module 6, according to one embodiment of the present invention, includes a memory array or bank 8, a write circuit 10 and a read circuit 12 for accessing the memory bank 8; a flag circuit 14, a first datum detector 16 and a second datum detector 18. The FIFO module 6 may be implemented as a part of an application specific integrated circuit (ASIC), and where more than one FIFO module 6 is required, several FIFO modules can be implemented on a single integrated circuit.

The memory bank 8 includes thirty-two individually addressable memory locations 20. However, the memory bank 8 may include more or less than thirty-two memory locations 20. Each memory location 20 can store data of any size, such as 9 or 10-bit codegroups that are used in 10 GbE. The memory locations 20 are shown in FIG. 1 to be arranged in ascending order of addresses required for addressing the memory locations 20, with the memory locations 20 lower in the memory bank 8 (adjacent the read circuit 12) requiring smaller addresses and the memory locations 20 higher in the memory bank 8 (adjacent the write circuit 10) requiring larger addresses.

The write circuit 10 includes a write pointer 22 and a look-back pointer 24 connected to the memory bank 8. The write pointer 22 stores a value that is output as an address on a write-address bus 26 for pointing to or addressing the memory locations 20 of the memory bank 8. The write pointer 22 is shown pointing to a memory location W. Similarly, the look-back pointer 24 stores a value that is output as an address on a look-back address bus 28 for pointing to or addressing the memory locations 20. The look-back pointer 24 is shown pointing to a memory location X, which is one memory location behind the memory location W. In other words, the value of the look-back pointer 24 is one less than the value of the write pointer 22. It should be noted that the value of the look-back pointer 24 may be lower than the value of the write pointer 24 by a value of two or higher to address a memory location X that trails or is a corresponding number of memory locations 20 away from the memory location W. In this manner, the look-back pointer 24 is coupled with the write pointer 22. The write circuit 10 is timed and clocked by a write-clock signal 30. The write circuit 10 also receives other inputs that include a write-pause signal 32, a write-enable signal 34 and a reset signal 35.

During operation of the write circuit 10, the write-clock signal 30 provides a timing clock for writing data, such as codegroups in the 10 GbE that are received via an input data bus 36 into the memory locations 20 pointed to or addressed by the write pointer 22. In other words, the write-clock signal 30 runs the write circuit 10. When the reset signal 35 is asserted, the write pointer 22 and the look-back pointer 24 are initialized. When the write-enable signal 34 is asserted, data on the input data bus 36 is written into a memory location 20 pointed to by the write pointer 22 on every rising write clock edge. On the next write clock edge, after the data is written, the value stored in the look-back pointer 24 is set to the value stored in the write pointer 22 and the write pointer 22 is incremented by one to point to a next memory location 20 in the sequence for writing. In other words, the look-back pointer 24 points to the memory location 20 one write clock cycle after the memory location 20 is written to and the data that is stored therein is made available on a look-back data bus 38. Data on the look-back data bus 38 is timed based on the write-clock signal 30. This feature allows written data to be read, checked or verified one write clock cycle after the data has been written. When the write-pause signal 32 is asserted, the value of the write pointer 22 is inhibited from being incremented to the address of the next memory location in sequence. This action results in the memory location 20 pointed to by the write pointer 22 being overwritten for as long as the write-pause signal 32 remains asserted. The use of this feature of the FIFO module 6 for deskewing data streams of an XAUI interface, will be described later.

The read circuit 12 includes a read pointer 40 and a look-ahead pointer 42. The read pointer 40 stores a value that is output as an address on a read-address bus 44 for pointing to or addressing memory locations 20. The read pointer 40 is shown in FIG. 1 pointing to a memory location Y. Similarly, the look-ahead pointer 42 stores a value that is output as an address on a look-ahead address bus 46 for pointing to or addressing the memory locations 20. The look-ahead pointer 42 is shown in FIG. 1 pointing to a memory location Z, one memory location ahead of the memory location Y. It should be noted that the memory location Z may be more than one memory location 20 ahead of the memory location Y to increase the data look-ahead capability. This feature allows the FIFO to cater for a longer codegroup comparison duration without requiring additional external register banks. In this manner, the look-ahead pointer 42 is coupled with the read pointer 40. The read circuit 12 is timed and clocked by a read-clock signal 48. The read circuit 12 receives various inputs including a read-enable signal 50, a read-pause signal 52 and a read-double-inc signal 54. The read circuit 12 is also reset using the reset signal 35.

During operation of the read circuit 12, the read-enable signal 50 is asserted to allow reading of data stored in two memory locations 20 addressed by the read pointer 40 and the look-ahead pointer 42, respectively on every rising read clock edge. Data read from the two memory locations, such as memory locations Y and Z, are made available on an output-data bus 56 and a look-ahead-data bus 58, respectively. After data at a memory location 20 is read, the value stored in the read pointer 40 is incremented by one so that the read pointer 40 points to a next memory location to be read. The new value stored in the look-ahead pointer 42 is computed based on the new value of the read pointer 40 incremented by a value of one. The new value of the look-ahead pointer 42 is then stored in the look-ahead pointer 42.

When the read-pause signal 52 is asserted, the read pointer 40 is inhibited from advancing, that is, the value of the read pointer is inhibited from increasing. When the read-double-inc signal 54 is asserted, the value stored in the read pointer 40 is incremented by a value of two instead of a value of one as previously described, after a read operation. In other words, when the read-double-inc signal 54 is asserted, the read pointer 40 is advanced by two memory locations, which has the effect of skipping over one memory location. The look-ahead pointer 42 allows data in the memory location Z to be read in advance so that a decision as to whether memory location Z can be skipped is made while the memory location Y is being read. If the data can be skipped, the read pointer 40 is advanced to bypass the memory location Z. The use of this feature of the FIFO module 6 for rate matching in the XAUI interface, will be described later.

The first datum detector 16 receives data from a memory location 20, that is pointed to by the look-back pointer 24, through the look-back data bus 38. This first datum detector 16 compares the data with a first predetermined datum and generates a first-datum-found signal 60 when there is a match. The first predetermined datum may be hardwired or programmable.

Similarly, the second datum detector 18 receives data from a memory location 20, that is pointed to by the look-ahead address bus 46 through the look-ahead data bus 58. This second datum detector 18 compares the data with a second predetermined datum and generates a second-datum-found signal 62 when there is a match. The second predetermined datum may also be hardwired or programmable.

The flag circuit 14 receives the values stored in the write pointer 22 and the read pointer 40 as inputs. The flag circuit 14 is timed and clocked by the read-clock signal 48. The flag circuit 14 may also be timed and clocked by the write-clock signal 30. The flag circuit 14 generates flags, such as an empty flag, a full flag, an underflow flag, and an overflow flag on a flag bus 64. These flags are known to those skilled in the art. The flag circuit 14 also generates a too-close trigger signal 66 and a too-far-apart trigger signal 68. The flag circuit 14 sets or asserts the too-close signal 66 when it determines that the difference in values stored in the write pointer 22 and the read pointer 40 is lower than a predetermined minimum distance. In other words, the too-close signal 66 is set when the read pointer 40 closes in on the write pointer 22 and the distance between the two pointers 22, 40 is below the predetermined minimum distance. The flag circuit 68 sets or asserts the too-far-apart signal 68 when it determines that the difference in values stored in the write pointer 22 and the read pointer 40 is higher than a predetermined maximum distance. In other words, the too-far-apart signal 68 is set when the two pointers drifts further and further apart until the distance between the two pointers 22, 40 is above the predetermined maximum distance. The predetermined minimum and maximum distances may also be hardwired or programmable.

Advantageously, the FIFO module according to the invention is simple, modular, area-efficient, has a deterministic system hardware structure and allows for systemic design and verification. The first and second datum to which data in the look-back data bus 38 and look-ahead data bus 58 are compared with respectively, are embedded in the FIFO module; no additional circuit external to the FIFO module is required. Any change in the first and second datum is limited internally to the FIFO module. Such a FIFO module may be verified independently. In the prior art, any change in a search datum requires a change in the circuit external to the FIFO module. Simulations for system verification then had to be performed at a system level. Such simulations are more difficult and time consuming to perform as compared to simulations that can now be advantageously done at a FIFO module level.

Moreover, to cater for an increase in codegroup comparison duration, all that is required is that the distance between the look-ahead pointer 42 and the read pointer 40 be increased accordingly. There is no need for changes in the system level design to add register banks due to the increase in codegroup comparison duration, as was done in the prior art. However, such an adjustment of the look-ahead pointer 42 will result in a smaller gap or distance between the write pointer 22 and the look-ahead pointer 42, which reduces the FIFO's ability to buffer data. Consequently, the FIFO can handle a correspondingly smaller difference in read and write data rates. The rate matching performance is degraded because it will have to be carried out more frequently to compensate for the difference in data rates. If a degraded system performance is tolerable, the savings in terms of area as compared to the prior art is maximal. If the degraded system is not tolerable, the size of the memory bank in the FIFO module may be increased so as to maintain an optimal gap between the write pointer and the look-ahead pointer. Increasing the size of the memory bank does not cause the area of an ASIC to increase as significantly as a register bank external to the FIFO module since the size of a memory cell is smaller than that of a register, in terms of chip real estate. Furthermore memory cells are organized transistor layout structures which provide better utilization of routing resources relative to that of register layout structures.

With reference now to FIGS. 1 and 2, the deskew circuit 2, which includes four FIFO modules 6 for deskewing four data streams received over four respective lanes in a XAUI interface, will be described next. The deskew circuit 2 includes four lane circuits 70 connected to a skew compensation unit 72. Each lane circuit 70 includes a FIFO module 6 for buffering data of a deserialized data stream 74 (FIG. 3) received on its input data bus 36. A clock signal recovered from the incoming data stream 74 is used as the write-clock signal 30 for driving the write circuit 10 of the FIFO module 6. This recovered clock signal can generally be referred to as a write domain clock. The first datum detector 16 of the FIFO module 6 is either hardwired or programmed to monitor the deserialized data stream 36 received in the FIFO module 6 for an "A" codegroup. As previously described, when an "A" codegroup is detected in the deserialized data stream 36, the FIFO module 6 asserts the first-datum-found signal 60.

Each FIFO module 6 is connected to a group of sticky registers 76 (also known to those in the art as a sticky register file). The sticky registers 76 receive the first-datum-found signal 60, and receive the value stored in the look-back pointer 24 of the FIFO module 6, via the look-back address bus 28. The sticky registers 76 are also clocked by the write-clock signal 30. The sticky registers 76 have two outputs, an align-char-detect signal 78 and an align-char-pos bus 80 which are the corresponding latched signals of the first-datum-detect signal 60 and signals on the look-back address bus 28, respectively. When the FIFO module 6 asserts the first-datum-detect signal 60, the sticky registers 76 latch or lock the address present on the look-back address bus 28 into the sticky registers 76. This address is an absolute address of the memory location in the FIFO module 6 having an "A" codegroup stored therein as previously described.

Synchronizers 82 are connected to the sticky registers 76 to receive the align-char-detect signal 78 and signals on the align-char-pos bus 80 from the sticky registers 76. The synchronizers 82 are clocked by a system-clock signal of the receiving side, and the system-clock signal is used as the read-clock signal 48 of the FIFO module 6. The system-clock signal of the receiving side can generally be referred to as a read domain clock. The system-clock signal of the receiving side does not have any phase relationship with the recovered clock signal of the transmitting side. However, it is specified in the XAUI standards that the difference between the frequency of the recovered clock of the transmitting side and the system-clock signal of the receiving side should be below 200 parts per million (ppm). The synchronizers 82 synchronize and retime the align-char-det signal 78 and signals on the align-char-pos bus 80, which are based on the write clock 30, to the system-clock signal 48 to generate two outputs i.e. an adet-syn signal 84 and signals on an apos-syn bus 86, respectively.

The skew compensation unit 72 receives the two outputs of the synchronizers 82 of each of the lane circuits 70. That is, the skew compensation unit 72 receives in total four adet-syn signals 84 and signals on four apos-syn buses 86. The skew compensation unit 72 is also clocked by the system_clock signal. When the skew compensation unit 72 determines that all four adet-syn signals are asserted, it reads the addresses of respective memory locations in the four FIFO modules 6 that contain "A" codegroups from the apos-syn buses 86. From these addresses, the skew compensation unit 72 determines the lane-to-lane or inter-lane skews. Finally, the skew compensation unit 72 generates write-pause signals 32A, 32B, 32C, 32D for the respective FIFO modules 6. Each write-pause signal is used to control the write pointer 22 of the respective FIFO module 6, to pause or inhibit its advancement for a period corresponding to the skew of the incoming data stream 74 received in the FIFO module 6. This action compensates for the skews between data streams received by the FIFO modules 6 and enables downstream data of the incoming data stream 74 to be aligned or deskewed.

The skew compensation unit 72 also generates a common write-enable signal 34 that is used to control, or more specifically, enable the writing of data in the incoming data streams 74 into the memory bank 8 of the FIFO modules 6. The skew compensation unit 72 also generates a reset signal 35 for resetting the FIFO modules 6, however the coupling of the reset signal 35 is not shown, and such coupling would be known to one skilled in the art.

An alignment monitoring unit 88 is connected to the output data buses 56 of the FIFO modules 6 for receiving data that are read from the FIFO modules 6. When the alignment monitoring unit 88 detects four consecutive error free "A" ordered sets, it asserts the deskew-done signal 92 to indicate that lane alignment or deskewing has been achieved. An "A" ordered set in 10 GbE terms is an "A" codegroup received from each of the respective FIFO modules 6 in a single read operation or cycle. In the event that less than four consecutive error free and aligned "A" ordered sets are received, the alignment monitoring unit 88 asserts the loss-of-alignment signal 90, which is provided to the skew compensation unit 72, and the skew compensation unit 72 then restarts the deskew process. When the deskew process is completed, the alignment monitoring unit 88 1) checks the data on the output data bus 56 of the four FIFO modules 6 for continued alignment; 2) tolerates alignment inconsistencies due to a predetermined reasonably low bit error rate and 3) asserts the loss-of-alignment signal 90 if alignment is not reliably maintained as specified in the standards.

Figure 4:
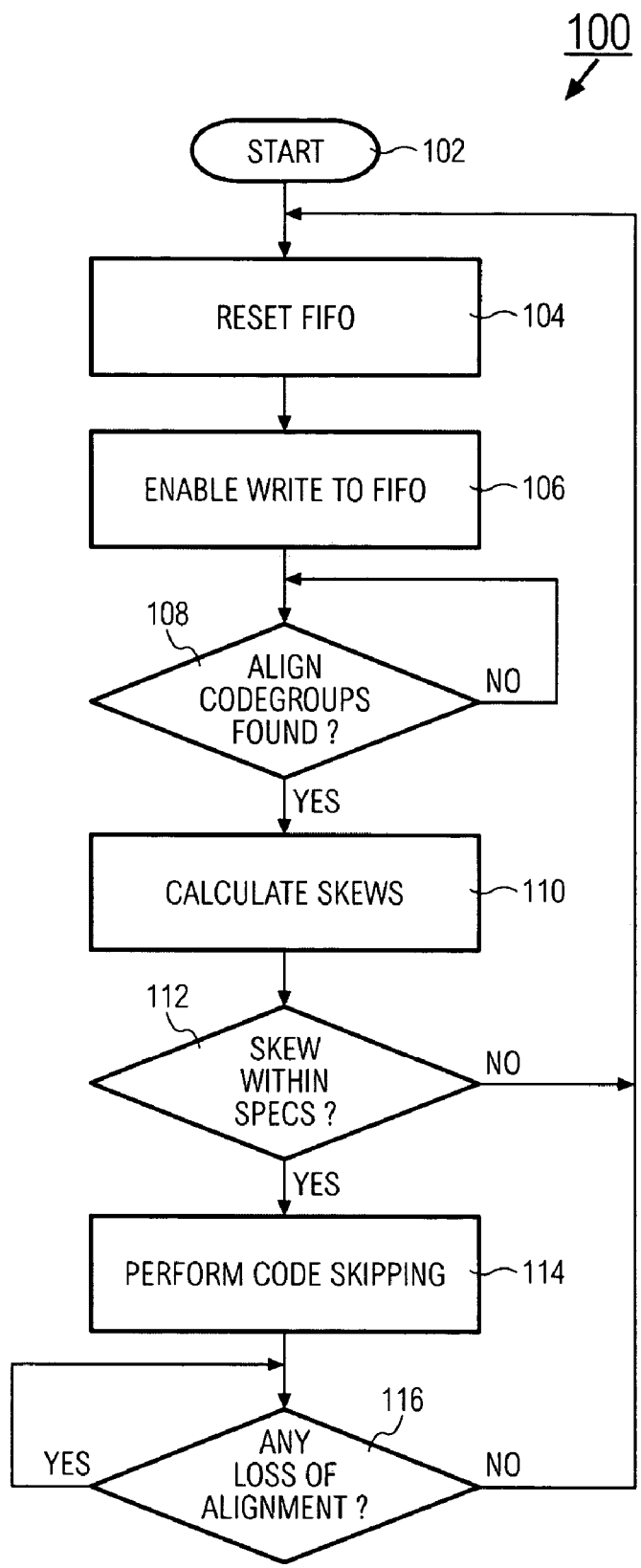
FIG. 4 is a flowchart of detailing the operation of the deskew circuit in FIG. 2.

The operation of the deskew circuit 2 is next described with additional reference to a flowchart shown in FIG. 4. The deskew process or sequence 100 of the deskew circuit 2 starts in a START step 102 when the receiver is powered up. The deskew sequence 100 next proceeds to a RESET FIFO step 104, wherein the skew compensation unit 72 asserts the reset signal 35 to reset the four FIFO modules 6. Resetting the four FIFO modules initializes the write pointer 22, look-back pointer 24, read pointer 40 and the look-ahead pointer 42. In this embodiment, the gap or distance between the write pointer 22 and the read pointer 40 is selected to be ten memory locations. Other gaps or distances between the write pointer 22 and the read pointer 40 are possible. The deskew sequence 100 next proceeds to an ENABLE WRITE TO FIFO step 106, wherein the skew compensation unit 72 asserts the write-enable signal 34 to allow codegroups in the incoming data streams 74 to be written into the memory banks 8 of the FIFO modules 6. As previously described, a codegroup is written to a memory location 20 on every write clock cycle of the write clock signal 30, and the value of the look-back pointer 24 is set to point at the memory location 20, which was written to on the previous clock cycle of the write clock signal 30. With this look-back pointer 24, a particular codegroup is available almost immediately after that particular codegroup is written.

The deskew sequence 100 next proceeds to an ALIGN CODEGROUPS FOUND? decision step 108. The deskew sequence 100 loops around this decision step 108 until it is determined that an "A" codegroup is detected to have been written into the memory bank 8 of each of the FIFO modules 6. Specifically, in this decision step 108, the deskew sequence 100 loops around the decision step 108 waiting for the first datum detectors 16 of the FIFO modules 6 to assert their respective first-datum-found signals 60. In this particular embodiment, the first-datum-found signals 60 are latched and synchronized to the system-clock signal 48. When the skew compensation unit 72 determines that the adet-syn signals 84, which are the latched and synchronized versions of the first-datum-found signals 60 are all asserted, the deskew sequence 100 exits the ALIGN CODEGROUPS FOUND? decision step 108 and proceeds to a CALCULATE SKEWS step 110, wherein the skew compensation unit 72 calculates the lane to lane or inter-lane skews. The calculation of inter-lane skews will be described in detail shortly, by way of an example.

After the inter-lane skews are calculated, the deskew sequence 100 proceeds to a SKEW WITHIN SPECS? decision step 112. In this decision step 112, the skew compensation unit 72 determines if the inter-lane skews are within predetermined specifications, for example determining whether the inter-lane skews are within four memory locations according to the XAUI recommendations. If it is determined in this decision step 112 that one or more of the inter-lane skews is not within specification, the deskew sequence 100 returns to the RESET FIFO step 104. However, if it is determined in the decision step 112 that all the inter-lane skews are within specification, the deskew sequence 100 proceeds to a PERFORM CODE SKIPPING step 114. In this step 114, the skew compensation unit 72 asserts the appropriate write-pause signals 32A–32D, as previously described to cause downstream codegroups in selected data streams to be skipped.

Figures 5A, 5B:
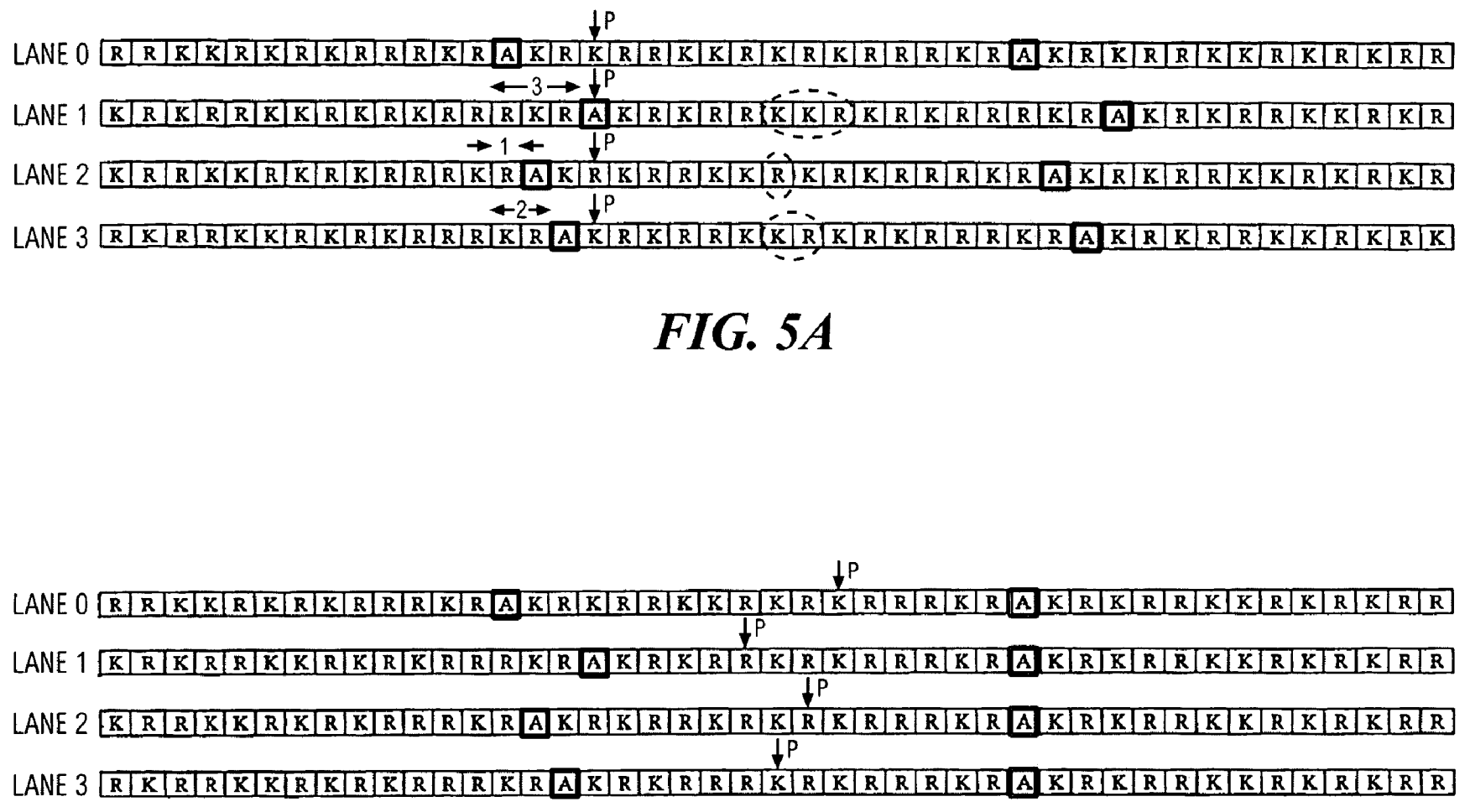

The CALCULATE SKEWS step 110 and the PERFORM CODE SKIPPING step 114 will now be described in more detail with the aid of FIGS. 5A and 5B. FIG. 5A shows four skewed data streams. Portions of the data streams to the left of the write pointers P are received in the FIFO modules 6, while those to the right of the write pointers P are yet to be received in the FIFO modules. If no deskewing is subsequently performed, those portions of the data streams to the right of the write pointers would be received in the FIFO modules as shown, i.e. with the "A" codegroups therein misaligned. FIG. 5B shows the same four data streams deskewed from a particular memory location in their respective FIFO modules 6. At a point in time shortly after the writing of an "A" codegroup in lane 0, it will be determined in the ALIGN CODEGROUP FOUND? decision step 108 that an "A" codegroup is found in each of the FIFO modules 6.

In the CALCULATE SKEWS step 110, the skew compensation unit 72 obtains the lane-to-lane skews using addresses in the FIFO modules 6 where "A" codegroups are detected to be stored. The skews between lane 0 and lane 1, lane 2 and lane 3, in this case, are determined to be three, one and two codegroups respectively as shown in FIG. 5A. Subsequently, for example at a time when the write pointer P for lane 1 is as shown in FIG. 5B, in the PERFORM CODE SKIPPING step 114, the skew compensation unit 72 asserts the write-pause signals for lanes 1, 2 and 3. The lengths of the write-pause signals for lanes 1, 2 and 3 are periods required for writing three, one and two codegroups respectively. In other words, the write pointer 22 for lane 1 is inhibited by its write-pause signal 32B to point to the same memory location 20 when writing the next three codegroups. That is, the three codegroups "KKR" in lane 1, shown encircled in FIG. 5A, are overwritten in the same memory location 20 to be effectively skipped. Similarly, the write-pause signals 32C, 32D for lane 2 and lane 3 cause the codegroups "R" and "KR", shown encircled in FIG. 5A, in the respective lanes to be skipped. After a period corresponding to the longest of the write-pause signals 32 of the FIFO modules 6, the data streams stored in the FIFO modules 6 become aligned, as shown in FIG. 5B. At this point in time, for this particular case, the write pointers 22 for lane 0, lane 2 and lane 3 would have been advanced by three, two and one memory locations, respectively with respect to the write pointer for lane 1, which remained stationary or unchanged.

After the PERFORM CODE SKIPPING step 114, the deskew sequence 100 next proceeds to an ANY LOSS OF ALIGNMENT? decision step 116, wherein the alignment monitoring unit 88 monitors the output data bus 56 of the four FIFO modules 6 to determine whether the data streams from all four FIFO modules are aligned. The alignment monitoring unit 88 determines that the data streams in all four FIFO modules 6 are aligned when it receives four consecutive error free align columns or align ordered sets, i.e. "A" codegroups from all four FIFO modules 6, in the same read operation. If it is determined that the data in the four lanes are all aligned, the deskew sequence 100 simply loops around the ANY LOSS OF ALIGNMENT? decision step 116 until the alignment monitoring unit 88 detects that incoming data streams 74 are misaligned, in which case, the deskew sequence returns to the RESET FIFO step 104, to once again perform deskewing of the incoming data streams 74.

Advantageously, with the look-back pointer in the FIFO module, deskewing may be performed earlier as compared to implementations using prior art FIFO modules.

Accordingly, the deskew circuit 2 is able to perform a method for deskewing two data streams. The deskewing method includes writing data of the two data streams into memory locations 20 of respective memory banks 8, which are addressable by respective write pointers 22. The deskewing method also includes noting two addresses in the respective memory banks wherein a written datum matches an alignment datum. A skew in the two data streams is determined using the two addresses. The advancement of one of the write pointers is paused for a period corresponding to the skew so that downstream data of the two data streams when written to the respective memory banks are aligned in the memory banks. This deskewing method may be implemented using prior art FIFO modules, wherein pausing advancement of a write pointer may be achieved by deasserting a write-enable signal.

With additional reference to FIG. 3, the rate matching circuit 4, which includes four FIFO modules 6, for rate matching the write domain clock of the transmitting side and the read domain clock of the receiving side will be described next. However, it should be noted that a rate matching circuit having more or less than four FIFO modules 6 would also work.

Each FIFO module 6 in a lane circuit 70 in FIG. 2, in addition to being connected to the respective sticky registers 76, is also connected to a rate matcher 120 The rate matcher 120 controls and coordinates the rate matching operation. When connected to the FIFO modules 6, the rate matcher 120 receives a too-close signal 66 and a too-far-apart signal 68 from each of the four FIFO modules 6. The rate matcher 120 also receives a second-datum-found signal 62 from each of the four FIFO modules 6. The FIFO modules 6 receive a common read-enable signal 50, a common read-pause signal 52, and a common read-double-inc signal 54 from the rate matcher 120. The rate matcher 120 is clocked by the system-clock 48.

In addition to being mutually connected, the FIFO modules 6 and the rate matcher 120 are further connected to output registers 122. Specifically, each FIFO module 6 is connected to the output registers 122 via its respective output data bus 56. Via the common read-enable signal 50 to the FIFO modules 6, the output registers 122 are able to synchronously receive codegroups that are read from each of the FIFO modules 6. The output registers 122 receive a skip-insert signal 124 from the rate matcher 120. The rate matcher 120 further receives an ipg-detect signal 126 from the output registers 122. The output registers 122 also outputs rate-matched codegroups on respective rate-matched output data buses 128. Data on the rate-matched output buses 128 may be read and presented to a control codegroup processor in the XGXS layer.

Figure 6:
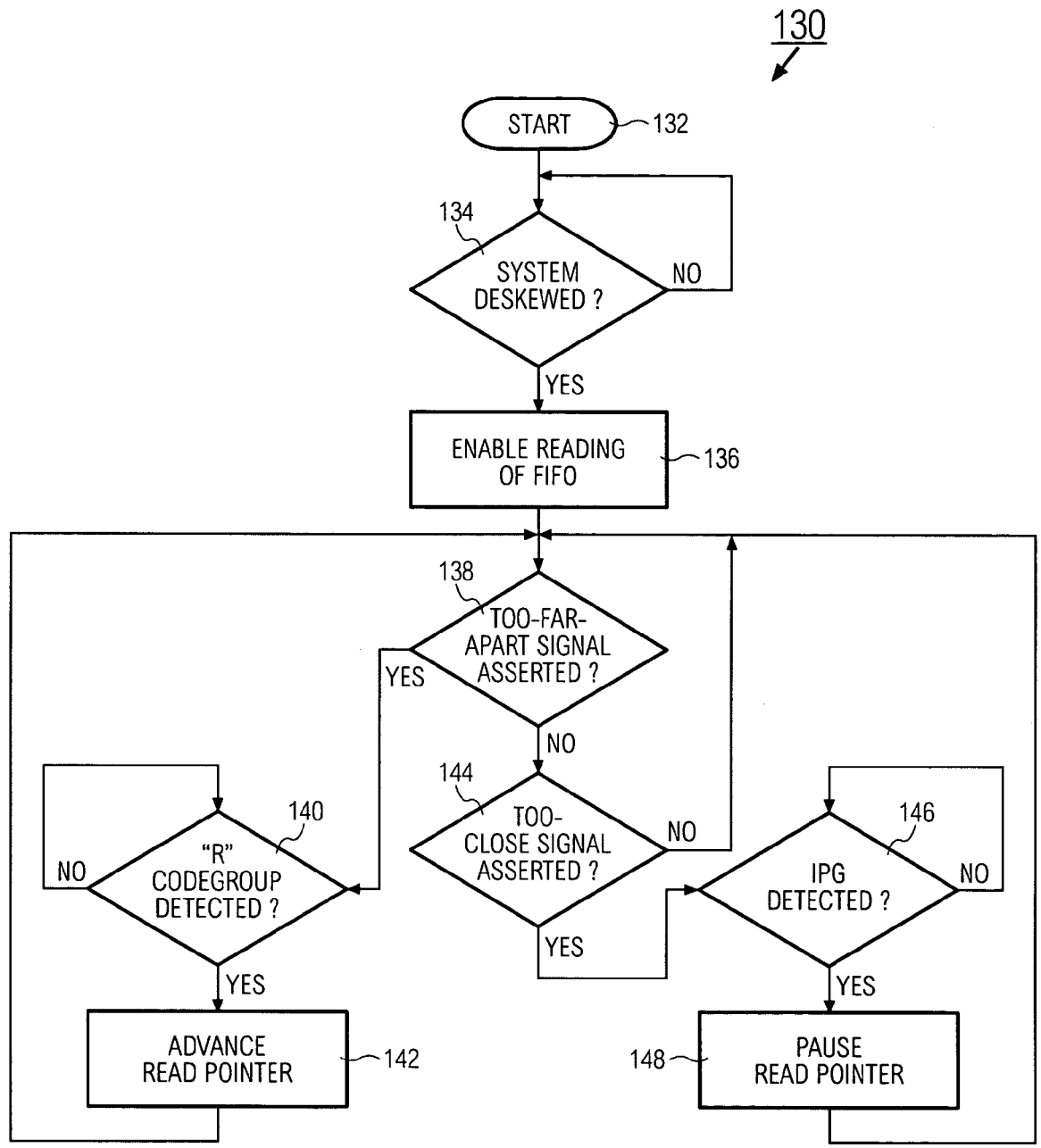
FIG. 6 is a flowchart detailing the operation of the rate matching circuit in FIG. 3.

The output registers 122, like the rate matcher 120, is clocked by the system-clock 48. The function of the various signals will become apparent from the following description of the operation of the rate matching circuit 4, with reference to the flowchart shown in FIG. 6.

The rate matching sequence or process 130 starts in a START step 132, wherein codegroups of the deserialized data streams 36 are written into the respective memory banks 8 of the respective FIFO modules 6 and are being deskewed by the deskew circuit 2. The codegroups of each deserialized data stream 36 are frequency locked, but are asynchronous to codegroups of the other deserialized data streams 36.

The rate matching sequence 130 next proceeds to a SYSTEM DESKEWED? decision step 134, wherein the rate matcher 120 waits for the deskew circuit 2, or more specifically the alignment monitoring unit 88 thereof, to assert the deskew-done signal 92. When it is determined in this step that the deskew-done signal 92 is asserted, the rate matching sequence 130 exits the SYSTEM DESKEW? decision step 134 and proceeds to an ENABLE READING OF FIFO step 136. In this step 136, the rate matcher 120 asserts the read-enable signal 50 and de-asserts the read-pause signal 52 and the read-double-inc signal 54. When the read-enable signal 50 is asserted, codegroups in each of the memory banks 8, that are addressed by respective read pointers 40, are output on the output-data bus 56 based on the system-clock 48. At this point, the codegroups in the different data streams are aligned or synchronized. However, there may be a difference between the frequency of the write clock 30 and the system-clock 48. Any difference in frequency will need to be compensated to ensure proper operation of the receiver.

The rate matching sequence 130 next proceeds to a TOO-FAR-APART SIGNAL ASSERTED? decision step 138, wherein the rate matcher 120 determines if the too-far-apart signals 68 of the respective FIFO modules 6 are asserted. As previously described, each FIFO module 6 asserts the too-far-apart signal 68 when the flag circuit 14 therein determines that the write clock 30, runs faster than the system-clock 48. In such a case, the write pointer 22 and the read pointer 40 drift further and further apart. When the flag circuit 14 determines that the difference in the pointer values exceeds a predetermined maximum distance, the flag circuit 14 asserts the too-far-apart signal 68. The predetermined maximum distance for a memory bank 8 of thirty-two memory locations 20 may for example be a distance of fifteen locations.

If it is determined in the TOO-FAR-APART SIGNALS ASSERTED? decision step 138 that the too-far-apart signals 68 are asserted, the rate matching sequence 130 proceeds to a "R" CODEGROUP DETECTED? decision step 140, wherein the rate matcher 120 determines if all the FIFO modules 6, or more specifically the second datum detectors 18 thereof, have detected "R" codegroups in their respective memory banks 8. Each of the second datum detectors 18 asserts the respective second-datum-found signal 62 when an "R" codegroup is detected. If it is determined in the "R" CODEGROUP DETECTED? decision step 140 that not all the second-datum-found signals 62 are asserted, the rate matching sequence 130 loops around the "R" CODEGROUP DETECTED? decision step 140. The rate matching sequence 130 exits the "R" CODEGROUP DETECTED? decision step 140 and proceeds to an ADVANCE READ POINTER step 142 when all the second-datum-found signals 62 are asserted. In the ADVANCE READ POINTER step 142, the rate matcher 120 asserts the read-double-inc signal 54 to instruct the read circuits 12 in the FIFO modules 6 to increment their respective read pointers 40 by a value of two, instead of a value of one, after a read operation. Such an advancing of the read pointers 40 results in the skipping of a detected "R" codegroup column in the data streams and the narrowing of the distance between the read pointers 40 and their respective write pointers 22. The rate matching sequence 130 next returns to the TOO-FAR-APART SIGNAL DETECTED? decision step 138.

Advantageously, with the look-ahead pointer in a FIFO module, the advancement of a read pointer may be performed on the fly as memory locations are being read. Unlike in the prior art, with the present invention no additional external circuitry is necessary to separately buffer read data.

If it is determined in the TOO-FAR-APART SIGNAL DETECTED? decision step 138 that the too-far-apart signals 68 are not asserted, the rate matching sequence 130 proceeds to a TOO-CLOSE SIGNAL DETECTED? decision step 144. In this step, the rate matcher 120 determines if all the FIFO modules 6 have asserted their respective too-close signals 66 to indicate that the distance between the write pointers 22 and the respective read pointers 42 is below the predetermined minimum distance. This predetermined minimum distance may be five memory locations 20 for a memory bank of thirty-two memory locations 20. As previously described, the too-close signal 66 is asserted when the system clock 48 is faster than the write clock 30 and causes the read pointers 40 to close in on the write pointers 22. If it is determined in the TOO-CLOSE SIGNAL DETECTED? decision step 144 that all the too-close signals 66 have been asserted, the rate matching sequence 130 proceeds to an INTER-PACKET GAP DETECTED? decision step 146.

In the INTER-PACKET GAP DETECTED? decision step 146, the rate matcher 120 waits for the ipg-detect signal 126 to be asserted by the output register 122. When the output register 122 detects that the codegroups in the output data buses 56 belongs to an inter-packet gap (IPG), the output register 122 asserts the ipg-detect signal 126. The rate matching sequence 130 then exits the INTER-PACKET GAP DETECTED? decision step 146 and proceeds to a PAUSE READ POINTER step 148, wherein the rate matcher 120 responds to the assertion of the ipg-detect signal 126 by asserting the read-pause signal 52. The assertion of the read-pause signal 52 causes all the FIFO modules 6 to temporarily stop incrementing their read pointers 40 so that the distance between the read pointers 40 and their respective write pointers 22 are widened. At the same time, the rate matcher 120 asserts the skip-insert signal 124 to cause the output register 122 to force a column of "R" codegroups onto the rate matched output data buses 128. Hence, a column of four "R" characters is inserted into the output data streams. The rate matching sequence finally returns to the TOO-FAR-APART SIGNAL ASSERTED? decision step 138.

Although the invention is described as implemented in the above-described embodiment, it is not to be construed to be limited as such. For example, the deskew circuit and the rate matching circuit may not share common FIFO modules. As another example, the synchronizers in each of the lane circuit in the deskew circuit may be removed if the deskew circuit has a common read and write domain clock.

I claim:

1. A rate matching circuit comprising:
   at least one FIFO module comprising:
      a memory bank having a plurality of individually addressable memory locations;
      a write pointer that is connected to the memory bank for addressing the memory locations to write data therein;
      a read pointer that is connected to the memory bank for addressing memory locations to read data therefrom; wherein the write pointer and read pointer are driven by separate clock signals;
      a look-ahead pointer that is coupled to the read pointer for addressing a first memory location that leads a second memory location addressable by the read pointer;
      a flag circuit that generates a trigger signal when a difference of addresses in the write pointer and the read pointer exceeds a predetermined threshold; and
      a detector that is connected to the memory bank for comparing data in the first memory location with a skip datum, the detector asserting a datum-found signal when the data in the first memory location matches the skip datum; and
   a rate matcher connected to the at least one FIFO module for receiving the trigger signal and the datum-found signal, and for thereby generating a control signal to advance the read pointer to skip the first memory location.

2. A first-in-first-out (FIFO) module comprising:
   a memory bank having a plurality of individually addressable memory locations;
   a write pointer that is connected to the memory bank for addressing a first memory location of the plurality of memory locations to write data on an input data bus into the first memory location;
   a read pointer that is connected to the memory bank for addressing a second memory location of the plurality of memory locations to read data in the second memory location onto an output data bus;
   at least one additional pointer that is connected to the memory bank for addressing a third memory location of the plurality of memory locations to read data stored in the third memory location; and
   a detector that is connected to the memory bank for receiving the data read from the third memory location and comparing the read data with a predetermined datum to determine if there is match.

3. A FIFO module according to claim 2, wherein the at least one additional pointer comprises a look-back pointer that is coupled to the write pointer for addressing a third memory location that trails the first memory location.

4. A FIFO module according to claim 3, wherein the third memory location is at least one memory location behind the first memory location.

5. A FIFO module according to claim 3, wherein the write pointer and the look-back pointer are driven by a common clock signal and wherein the third memory location is the first memory location at least one clock cycle after the first memory location is written to.

6. A FIFO module according to claim 5, wherein an address of the third memory location is readable from the FIFO module.

7. A FIFO module according to claim 2, wherein the at least one additional pointer comprises a look-ahead pointer that is coupled to the read pointer to address a third memory location that leads the second memory location.

8. A FIFO module according to claim 7, wherein the third memory location is at least one memory location ahead of the second memory location.

9. A deskew circuit comprising:
   at least two FIFO modules, each of the at least two FIFO modules comprising:
      a memory bank having a plurality of individually addressable memory locations;
      a write pointer that is connected to the memory bank, the write pointer storing a write address that is increasable for addressing the memory locations to write data therein;
      a look-back pointer that is coupled to the write pointer for addressing a first memory location that trails a second memory location addressable by the write pointer; and
      a detector that is connected to the memory bank for comparing data in the first memory location with an alignment datum, the detector asserting a datum-found signal when the datum in the first memory location matches the alignment datum; and a skew compensation unit that is connected to the at least two FIFO modules for receiving addresses of respective first memory locations of the at least two FIFO modules when the respective datum-found signals are asserted, and for thereby deter-mining a skew using the addresses and generating a control signal for controlling the write pointer of one of the at least two FIFO modules to compensate for the skew.

10. A deskew circuit according to claim 9, wherein the skew compensation unit comprises a skew compensation unit for receiving addresses of respective third memory locations that are latched by the respective datum-found signals.

11. A deskew circuit according to claim 10, wherein the skew compensation unit comprises a skew compensation unit for receiving latched addresses of respective third memory locations that are synchronized to a clock that drives the skew compensation unit.

12. A deskew circuit according to claim 9, wherein the control signal for controlling the write pointer of one of the at least two FIFO modules comprises a control signal that inhibits increase of the write address in the write pointer for a period corresponding to the skew.

* * * * *

UNITED STATES PATENT AND TRADEMARK OFFICE
CERTIFICATE OF CORRECTION

| | | |
|---|---|---|
| PATENT NO. | : 7,093,061 B2 | Page 1 of 1 |
| APPLICATION NO. | : 10/782613 | |
| DATED | : August 15, 2006 | |
| INVENTOR(S) | : Jeff Boon Kiat Teo | |

It is certified that error appears in the above-identified patent and that said Letters Patent is hereby corrected as shown below:

Column 15, Line 5, Claim 9, delete "deter-mining" and -- determining --.

Signed and Sealed this

First Day of June, 2010

David J. Kappos
*Director of the United States Patent and Trademark Office*